(12) United States Patent
Fushimi et al.

(10) Patent No.: US 10,209,930 B2
(45) Date of Patent: Feb. 19, 2019

(54) PRINTER WITH TIME INFORMATION COMPARING FUNCTION

(71) Applicant: RISO KAGAKU CORPORATION, Tokyo (JP)

(72) Inventors: Takahiro Fushimi, Ibaraki (JP); Takaomi Ueda, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 0 days.

(21) Appl. No.: 15/855,259

(22) Filed: Dec. 27, 2017

(65) Prior Publication Data

US 2018/0181350 A1 Jun. 28, 2018

(30) Foreign Application Priority Data

Dec. 28, 2016 (JP) ................................ 2016-255406

(51) Int. Cl.
*G06F 3/12* (2006.01)
(52) U.S. Cl.
CPC ............ *G06F 3/121* (2013.01); *G06F 3/1205* (2013.01); *G06F 3/1217* (2013.01); *G06F 3/1234* (2013.01); *G06F 3/1259* (2013.01)
(58) Field of Classification Search
CPC ...................................................... G06F 3/121
See application file for complete search history.

(56) References Cited

U.S. PATENT DOCUMENTS

| 6,295,541 B1* | 9/2001 | Bodnar ............. G06F 17/30581 |
| 2004/0114156 A1* | 6/2004 | Azami .................... G06K 15/00 358/1.1 |
| 2014/0192624 A1* | 7/2014 | Ono ........................ G04R 20/18 368/46 |

FOREIGN PATENT DOCUMENTS

JP 2003-263517 9/2003

* cited by examiner

*Primary Examiner* — Nicholas Pachol
(74) *Attorney, Agent, or Firm* — Greenblum & Bernstein, P.L.C.

(57) ABSTRACT

A printer includes: an image former configured to form an image on a sheet based on a print job; a processor; and a memory including instructions that, when executed by the processor, cause the processor to perform operations. The operations include: comparing first time information indicating time information set for a region where the printer is allowed to be present and second time information indicating time information in a region where the printer is currently present and determining whether a time difference between the first time information and the second time information is greater than a predetermined time, and upon determining that the time difference is greater than the predetermined time, calling for execution of maintenance of the printer and selectably displaying options of the execution of the maintenance of the printer and execution of limited print processing by the image former.

3 Claims, 6 Drawing Sheets

PRINTER WITH TIME INFORMATION COMPARING FUNCTION

CROSS REFERENCE TO RELATED APPLICATION

This application is based upon and claims the benefit of priority from the prior Japanese Patent Application No. 2016-255406, filed on Dec. 28, 2016, the entire contents of which are incorporated herein by reference.

BACKGROUND

1. Technical Field

The disclosure relates to a printer with a time information comparing function.

2. Related Art

With the globalization of markets in recent years, printers are shipped to various countries and regions. For example, in offices and the like to which the printers are shipped, the printers are increasingly used while being shared among multiple computers.

Since an usage environment of the printers such as the air temperature, the humidity, and the power supply voltage varies among the countries and regions to which the printers are shipped, the printers are each generally shipped with setting such as print setting, time setting, and voltage setting being set to default in accordance with the usage environment in which the printer is to be used, such that the printer can operate properly.

Japanese Patent Application Publication No. 2003-263517 discloses a time monitoring system. The time monitoring system includes a reference time unit which keeps a reliable reference time calibrated based on the coordinated universal time (UTC), a client time obtaining unit which obtains time information used by a client at a predetermined timing via a network, and a time monitoring unit which compares the client time obtained by the client time obtaining unit and the reference time obtained from the reference time unit and monitors whether the time difference between the two times is within a predetermined range and which proves execution of the monitoring.

SUMMARY

The printer is not only used in the same office but is sometimes moved to another office distant from the office where the printer has been originally shipped and used, due to reasons such as, for example, moving of the office.

In such a case, the aforementioned time monitoring system compares the client time obtained by the client time obtaining unit and the reference time obtained from the reference time unit and monitors whether the time difference between the two times is within the predetermined range and, when the time difference is out of the predetermined range, gives warning or the like. However, the time monitoring system does not support changing of setting of the printer. Accordingly, even when the warning is given and, for example, leaving the print setting as it is leads to failure, the printer continues to be used without the print setting being changed by the judgement of the user.

As a result, this may cause failure of the printer unexpected by the user or a decrease in print quality.

The disclosure is directed to a printer which can reduce a failure rate and guarantee print quality when the printer is moved to a region distant from a region where the printer has been used.

A printer in accordance with some embodiments includes: an image former configured to form an image on a sheet based on a print job; a processor; and a memory including instructions that, when executed by the processor, cause the processor to perform operations. The operations include: comparing first time information indicating time information set for a region where the printer is allowed to be present and second time information indicating time information in a region where the printer is currently present and determining whether a time difference between the first time information and the second time information is greater than a predetermined time, and upon determining that the time difference is greater than the predetermined time, calling for execution of maintenance of the printer and selectably displaying options of the execution of the maintenance of the printer and execution of limited print processing by the image former.

In the aforementioned configuration, when the printer is moved to a region distant from a region where the printer has been originally shipped and used, the user can recognize that maintenance of optimizing setting of the printer is necessary. Accordingly, the user can immediately call a service personnel and have the service personnel execute the maintenance.

Meanwhile, when the user desires perform printing as soon as possible even with limits, the printer can continue an limited printing operation.

As described above, the user can select the optimization of the setting by maintenance or the continuance of the printing with functions being limited. This can reduce the failure rate of the printer and guarantee print quality when the printer is moved to a region distant from a region where the printer has been used.

The printer may be connected to information processing devices via a network. The operations may include: upon receiving, from each of the information processing devices, the print job to which third time information set in the information processing device is attached, extracting the third time information from the received print job as the second time information; comparing the first time information and the second time information extracted from each of the print jobs received from the respective information processing devices and determining whether a number of the print jobs with the time difference greater than the predetermined time exceeds half a number of the plurality of print jobs; and upon determining that the number of the print jobs with the time difference greater than the predetermined time exceeds half the number of the plurality of print jobs, calling for the execution of the maintenance of the printer and selectably displaying options of the execution of the maintenance of the printer and the execution of the limited print processing by the image former.

In the aforementioned configuration, the printer can make assumptions about whether the printer is moved to a region distant from the region where the printer has been originally shipped and used also when no server is provided, by using the time information included in each of the print jobs received from a plurality of clients connected via the network.

The printer may be connected to information processing devices via a network. The operations may include: upon receiving, from each of the information processing devices, the print job to which third time information set in the information processing device is attached, extracting the third time information from the received print job as the second time information; upon receiving the print job from one of the information processing devices and not receiving the print jobs from any of the remaining information processing devices within a predetermined period after reception of the print job from the one of the information processing devices, comparing the second time information extracted from the received print job and the first time information and determining whether the time difference is greater than the predetermined time; and upon determining that the time difference is greater than the predetermined time, calling for the execution of the maintenance of the printer and selectably displaying options of the execution of the maintenance of the printer and the execution of the limited print processing by the image former.

In the aforementioned configuration, when the printer receives no print job within the predetermined period, the printer can make assumptions about whether the printer is moved to a region distant from the region where the printer has been originally shipped and used, by using the time information included in the received print job, without keep on waiting. Accordingly, it is possible to call for the execution of the maintenance and to selectably display options of the execution of the maintenance of the printer and the execution of the limited print processing by the image former, without a user waiting for a long time.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Embodiment 1

Figure 1:
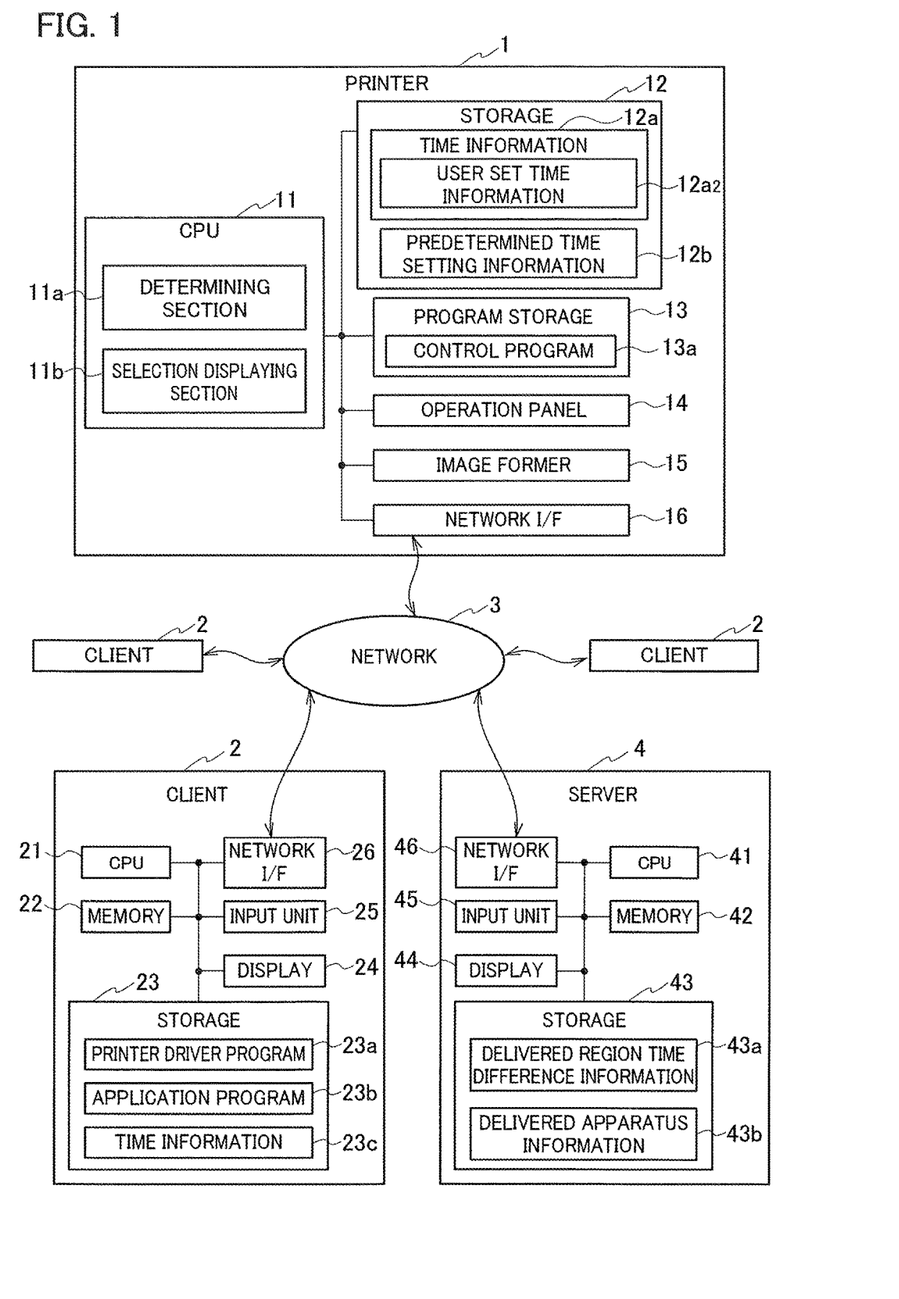
FIG. 1 is a configuration diagram illustrating configurations of a printer according to Embodiment 1 of the present invention, clients, and a server.

FIG. 1 is a configuration diagram illustrating configurations of a printer 1 according to Embodiment 1 of the present invention, clients 2, and a server 4. Note that the clients 2 and the server 4 are collectively referred to as information processing devices in this description.

As illustrated in FIG. 1, the printer 1 is connected to multiple (for example, three in this case) clients 2 via a network 3 such as the Internet or a wireless or wired intranet, and forms images by receiving print jobs from the clients 2. The printer 1 is also connected to the server 4 via the network 3.

Each of the clients 2 is, for example, a computer device such as a general-purpose personal computer, a tablet, or a smartphone, and creates the print job and sends the print job to the printer 1 via the network 3 to print it. Each client 2 includes a CPU 21, a memory 22, a storage 23, a display 24 such as a liquid crystal display, an input unit 25 such as a keyboard and a mouse, a network I/F 26 connected to the network 3, and the like.

The storage 23 stores a not-illustrated operating system (OS) program, a printer driver program 23a, and various application programs 23b such as a browser program and a document creating program.

The storage 23 stores time information 23c indicating a time set for each region such as a standard time.

The CPU 21 controls operations of the entire client 2 by executing the programs stored in the storage 23. Moreover, the CPU 21 particularly executes the printer driver program 23a to generate the print job based on data created by using the various application programs 23b such as the browser program and the document creating program and to send the print job to the printer 1 while attaching the time information 23c kept by a not-illustrated clock and stored in the storage 23, to the print job.

The server 4 is a device which manages the printer 1 and the clients 2. The server 4 includes a CPU 41, a memory 42, a storage 43, a display 44 such as a liquid crystal display, an input unit 45 such as a keyboard and a mouse, a network I/F 46 connected to the network 3, and the like.

The storage 43 stores a not-illustrated operating system (OS) program. Moreover, the storage 43 stores delivered region time difference information 43a and delivered device information 43b. In the delivered region time difference information 43a, delivery information indicating a delivery region to which the managed printer 1 is shipped and a time difference from the Greenwich Mean Time in the region indicated by the delivery information are stored in association. In the delivered device information 43b, the delivery information and a device ID by which the printer 1 can be identified are associated with each other. Here, the region means a region using the same standard time. Due this configuration, for example, when the device ID is known, the delivery information is determined based on the delivered device information 43b and the time difference from the Greenwich Mean Time in the region indicated by the delivery information is determined based on the delivered region time difference information 43a. Accordingly, although not illustrated, by obtaining the Greenwich Mean Time via the network 3, it is possible to calculate region set time information which is time information indicating the time set for the region corresponding to the printer 1 indicated by the device ID, that is time information set for the region where the printer 1 is allowed to be present.

The CPU 41 executes the operating system (OS) program stored in the storage 43 to control operations of the entire server 4. Moreover, upon receiving a query on the time information from the printer 1, the CPU 41 sends the printer 1 the time information corresponding to the device ID sent together with this query.

The printer 1 includes a CPU 11, a storage 12, a program storage 13, an operation panel 14, an image former 15, a network I/F 16 connected to the network 3, and the like.

The storage 12 stores time information 12a and predetermined time setting information 12b in addition to the print jobs sent by the clients 2.

The time information 12a stored in the storage 12 includes user set time information 12a2.

The user set time information 12a2 is existing region time information indicating time information in the region where the printer 1 is currently present. Specifically, the user set time information 12a2 is time information which is set by the user in initial setting performed when the printer 1 is shipped and turned on for the first time and which is then kept by a not-illustrated clock. The user set time information 12a2 is stored to be rewritable by the user.

The predetermined time setting information 12b is information in which a predetermined time is stored for each piece of delivery information. Here, the predetermined time is set in advance as an allowable range of a time difference as described below. For example, assume a case where the delivery information is set to a region corresponding to all of Japan. In this case, the predetermined time is set to 2 (hr) because it is possible to assume that the printer 1 is likely to be moved to a different country far away from Japan if the time difference is more than 2 (hr). Moreover, when the delivery information is set to a region corresponding to all of Europe, the predetermined time is set to 6 (hr). This is because, in Europe, various standard times are specified in various large and small countries, and it is possible to assume that the printer 1 is moved within Europe if the time difference is 6 (hr) or less.

The program storage 13 consists of a semiconductor memory and the like and stores a control program 13a which is used by the CPU (processor) 11 to control operations of the entire printer 1 and which causes the CPU 11 to function as a determining section 11a, a selection displaying section 11b, and an extracting section 11c.

The operation panel 14 receives various types of setting in the printer 1 such as on/off of power supply, switching of image formation such as copying and printing, the number and size of sheets in image formation, the print density, and the like, through user operations. Moreover, the operation panel 14 displays a maintenance recommendation screen.

The image former 15 forms images based on the print jobs received from the clients 2. The image former 15 executes the image formation by using any of various printing methods such as a stencil printing method, a laser printing method, and an inkjet method in which printing is performed by ejecting inks from inkjet heads of various colors.

The CPU 11 executes the control program 13a stored in the program storage 13 to control the entire printer 1 and to function as the determining section 11a and the selection displaying section 11b which implement the functions of the printer 1.

The determining section 11a compares the region set time information indicating the time information set for the region where the printer 1 is allowed to be present and the existing region time information indicating the time information in the region where the printer 1 is currently present to determine whether the time difference exceeds the predetermined time.

When the determining section 11a determines that the time difference exceeds the predetermined time, the selection displaying section 11b calls for execution of maintenance of the printer 1 (or calls for contact of maintenance of the printer 1) to the user and also selectably displays options of the execution of the maintenance of the printer 1 and execution of limited print processing by the image former 15.

Next, operations of the printer 1 configured as described above are explained with reference to the drawings.

The printer 1 queries the server 4 of the time information to determine whether itself (printer 1) has been moved to a distant location.

Figure 2:
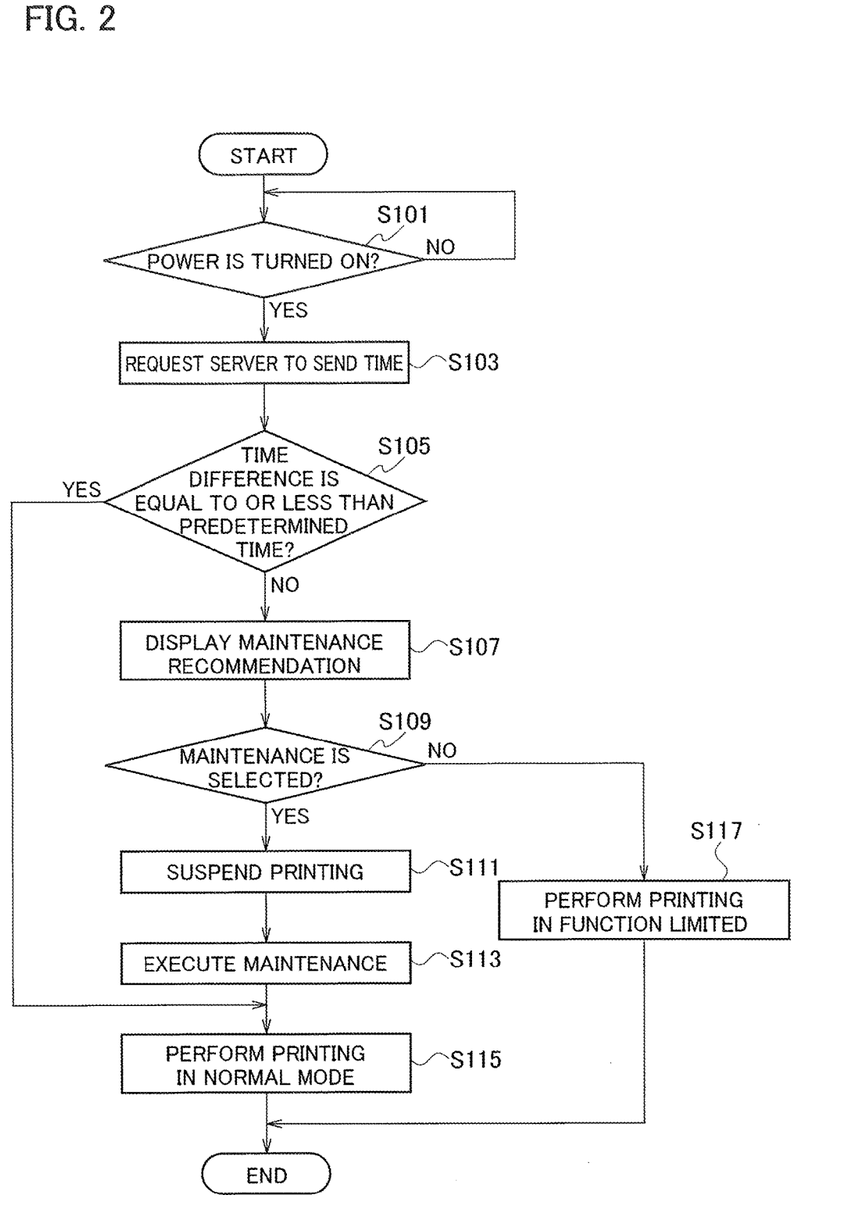
FIG. 2 is a flowchart illustrating processing contents of the printer according to Embodiment 1.

FIG. 2 is a flowchart illustrating processing contents of the printer 1.

As illustrated in FIG. 2, when power is turned on (step S101), the printer 1 sends the device ID of itself to the server 4 via the network 3 and requests the server 4 to send the time information (step S103). In response to this request for sending the time information, the server 4 sends the printer 1 the time information (region set time information) indicating the time set for the region corresponding to the printer 1 indicated by the device ID, as a reply.

Then, the determining section 11a of the printer 1 compares the time information (region set time information) sent from the server 4 and the user set time information 12a2 (existing region time information) stored in the storage 12 to determine whether the time difference between the two pieces of information is equal to or less than the predetermined time (step S105). In this case, the predetermined time is determined based on the predetermined time setting information 12b, as a predetermined time corresponding to the delivery information included in the user set time information 12a2.

When the determining section 11a determines that the time difference is equal to or less than the predetermined time (YES in step S105), it is possible to assume that the clock in the printer 1 is off or the printer 1 is moved to a relatively close region. Accordingly, the printer 1 executes the print processing in a normal mode without operation limits (step S115).

Meanwhile, when the determining section 11a determines that the time difference exceeds the predetermined time (NO in step S105), there is a possibility that the printer 1 is moved to a region distant from a region where the printer 1 has been shipped and installed and that the current setting is not optimal in an usage environment where the printer 1 is moved.

In order to prompt optimization of the setting, the selection displaying section 11b displays the maintenance recommendation screen on the operation panel 14 (step S107).

Figure 3:
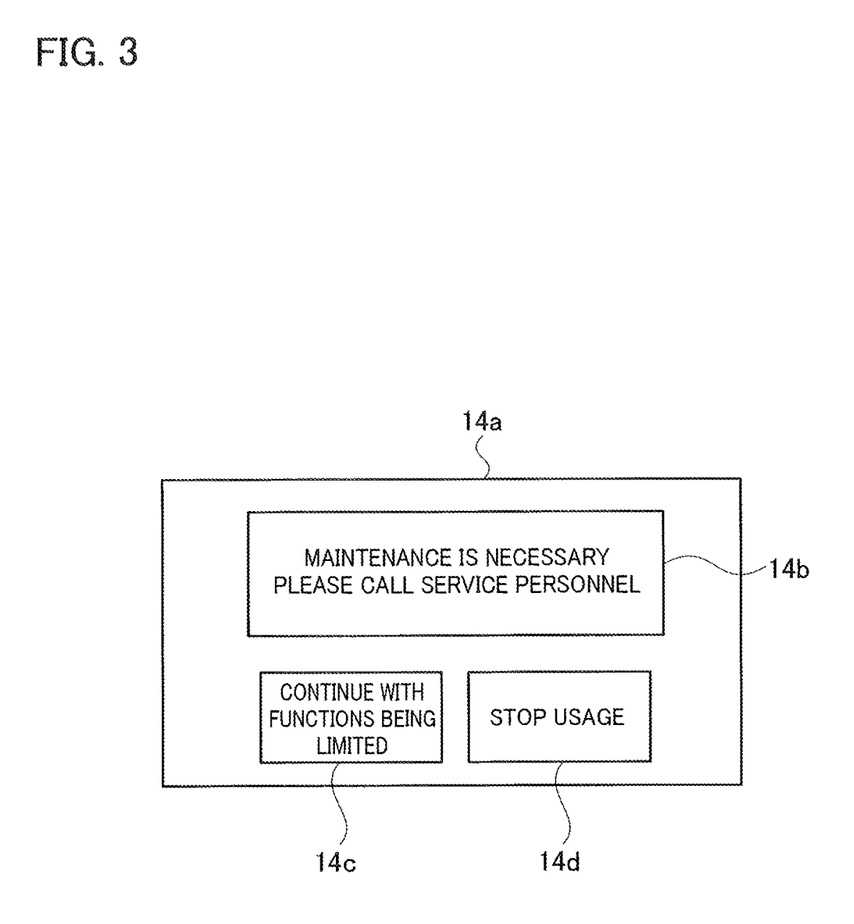
FIG. 3 is a view illustrating an example of a maintenance recommendation screen displayed on an operation panel 14.

FIG. 3 is a view illustrating an example of the maintenance recommendation screen displayed on the operation panel 14.

As illustrated in FIG. 3, the maintenance recommendation screen 14a displayed on the operation panel 14 is provided with a message display field 14b which displays, for example, a message of "maintenance is necessary. Please call service personnel," a button 14c for continuing the printing with the functions being limited, and a button 14d for suspending the printing to execute the maintenance.

The user can thereby recognize that the maintenance is necessary in the printer 1. When the user desires to immediately call the service personnel and have the service personnel execute the maintenance, the user pushes the button 14d.

Meanwhile, when the user desires to perform the printing as soon as possible even at a low printing speed, the user pushes the button 14c and the printing operation can be thereby continued with the functions being limited, that is with limits.

When the button 14d is pushed (YES in step S109), the printing is suspended to execute the maintenance (step S111).

Then, the user calls the service personnel and the service personnel performs maintenance work such as correction of the delivery information, correction of the user set time information 12a2 in accordance with a region where the printer 1 is to be used, and correction of the driving power supply in accordance with the region where the printer 1 is to be used. Thereafter, the printer 1 is recovered (step S113) and the print processing is executed in the normal mode without the operation limits (step S115).

Meanwhile, when the user does not select the execution of maintenance, that is presses the button 14c in step S109 (NO in step S109), the selection displaying section 11b sets the mode of print processing to a function limited mode and executes the printing in the function limited mode (step S117). This function limited mode is a mode in which functions are limited in the print processing by the image former 15 such that: only the sheet conveyance speeds of "intermediate" and "low" are selectable out of the sheet conveyance speeds of "high," "intermediate," and "low"; a continuous printable time which is normally "10" (hr) is set to "5" (hr); and other similar limits are provided, so that an increase in failure rate can be prevented and the print quality can be guaranteed in the harshest usage environment.

Making the function limited mode selectable allows the user to cause the printer 1 to execute the print processing with the print speed and the continuous printable time being limited, instead of immediately performing the maintenance and establishing the setting optimal for the current usage environment. Accordingly, the printing can be continued with the failure rate reduced and the print quality guaranteed.

As described above, in the printer 1, the determining section 11a compares the region set time information indicating the time information set for the region where the printer 1 is allowed to be present and the existing region time information indicating the time information in the region where the printer 1 is currently present to determine whether the time difference exceeds the predetermined time. When the determining section 11a determines that the time difference exceeds the predetermined time, the selection displaying section 11b calls for the execution of the maintenance of the printer 1 and also selectably displays options of the execution of the maintenance of the printer 1 and the execution of the limited print processing by the image former 15.

The user can thereby recognize that the maintenance of optimizing the setting of the printer 1 is necessary when the printer 1 is moved to a region distant from the region where the printer 1 has been originally shipped and used. Accordingly, the user can immediately call the service personnel and have the service personnel execute the maintenance.

Meanwhile, when the user desires to perform printing as soon as possible even with limits, the printer 1 can continue the limited printing operation.

As described above, the user can select either the optimization of the setting by maintenance or the continuance of the printing with the functions being limited. This can reduce the failure rate of the printer 1 and guarantee the print quality.

Note that the aforementioned determination processing can be performed also when the printer 1 is not connected to the network, by storing the readable but non-rewritable region set time information in the storage 12 in the initial setting and comparing the stored region set time information and the existing region time information.

Embodiment 2

In embodiment 1, description is given of the example in which the printer 1 queries the server 4 of the time information to make assumptions about whether the printer 1 is moved to a distant location. However, the present invention is not limited to this example.

Figure 4:
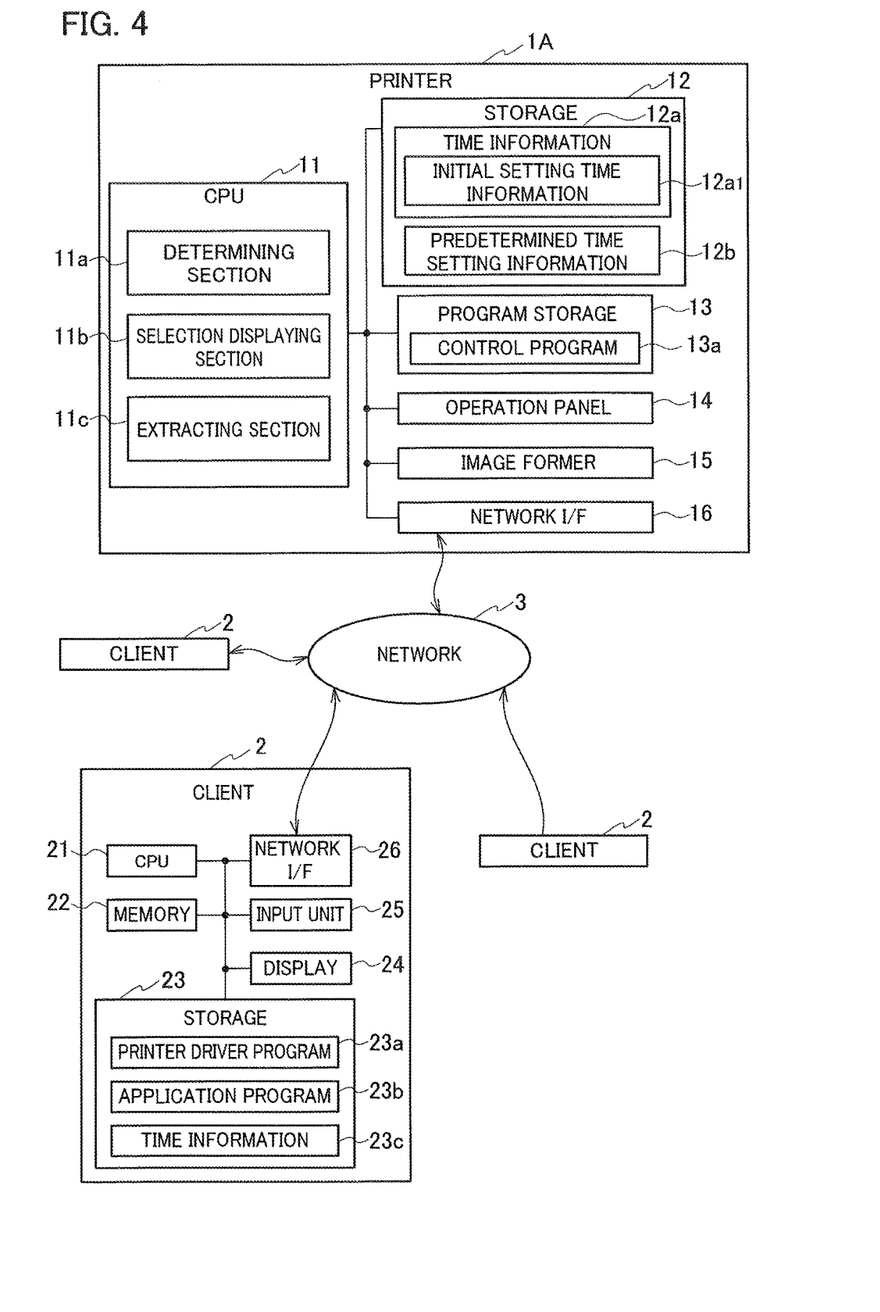
FIG. 4 is a configuration diagram illustrating configurations of the printer according to Embodiment 1 and the clients.

In Embodiment 2 of the present invention, description is given of an example in which a printer 1A assumes, based on the time information included in each of the print jobs received from the multiple clients 2, that the printer 1A is moved to a distant location when the time difference between the time of the printer 1A and the time of each of more than half of the clients 2 (print jobs) exceeds the predetermined time. Here, description is given of an example in which the printer 1A assumes, based on the time information included each of the print jobs sent from three clients 2, that the printer 1A is moved to a distant location when the time difference between the time of the printer 1A and the time of each of two clients 2 exceeds the predetermined time.

FIG. 4 is a configuration diagram illustrating configurations of the printer 1A and the clients 2.

As illustrated in FIG. 4, the printer 1A is connected to multiple (for example, three in this case) clients 2 via the network 3 such as the Internet or the wireless or wired intranet, and forms images by receiving the print jobs from the clients 2.

The clients 2 have the same configuration as the clients 2 described in Embodiment 1 and description thereof is thus omitted.

The printer 1A includes the CPU 11, the storage 12, the program storage 13, the operation panel 14, the image former 15, the network I/F 16 connected to the network 3, and the like.

The storage 12 stores the time information 12a and the predetermined time setting information 12b in addition to the print jobs sent by the clients 2.

Unlike in Embodiment 1, the time information 12a stored in the storage 12 includes initial setting time information 12a1 (region set time information), instead of the user set time information 12a2.

The initial setting time information 12a1 includes the delivery information corresponding to the region to which the printer 1A is shipped, and is time information which is set as initial setting at a factory based on the delivery information and which is then kept by a not-illustrated clock. The initial setting time information 12a1 is stored such that the user cannot rewrite the initial setting time information 12a1. The predetermined time setting information 12b is the same as the predetermined time setting information 12b described in Embodiment 1. Description of the other configurations denoted by the same reference numerals and having the same functions as the configurations described in Embodiment 1 are omitted.

The CPU 11 executes the control program 13a stored in the program storage 13 to control the entire printer 1A and to function as the determining section 11a, the selection displaying section 11b and the extracting section 11c which implement the functions of the printer 1A.

When the printer 1A receives the print job to which the time information set in the server 2 is attached, the extracting section 11c extracts the time information included in the received print job as the existing region time information.

The determining section 11a compares the existing region time information extracted from each of the multiple print jobs received from the respective three clients 2 and the region set time information (region set time information at the time point of receiving the print job) indicating the time information set for the region where the printer 1A is allowed to be present to determine whether the number of print jobs with the time difference exceeding the predetermined time exceeds half the number of the multiple print jobs.

When the determining section 11a determines that the number of print jobs with the time difference exceeding the predetermined time exceeds half the number of multiple print jobs, the selection displaying section 11b calls for execution of maintenance of the printer 1A (or calls for contact of maintenance of the printer 1A) and also selectably displays options of the execution of the maintenance of the printer 1A and the execution of the limited print processing by the image former 15.

Next, operations of the printer 1A configured as described above are explained with reference to the drawings.

Figure 5:
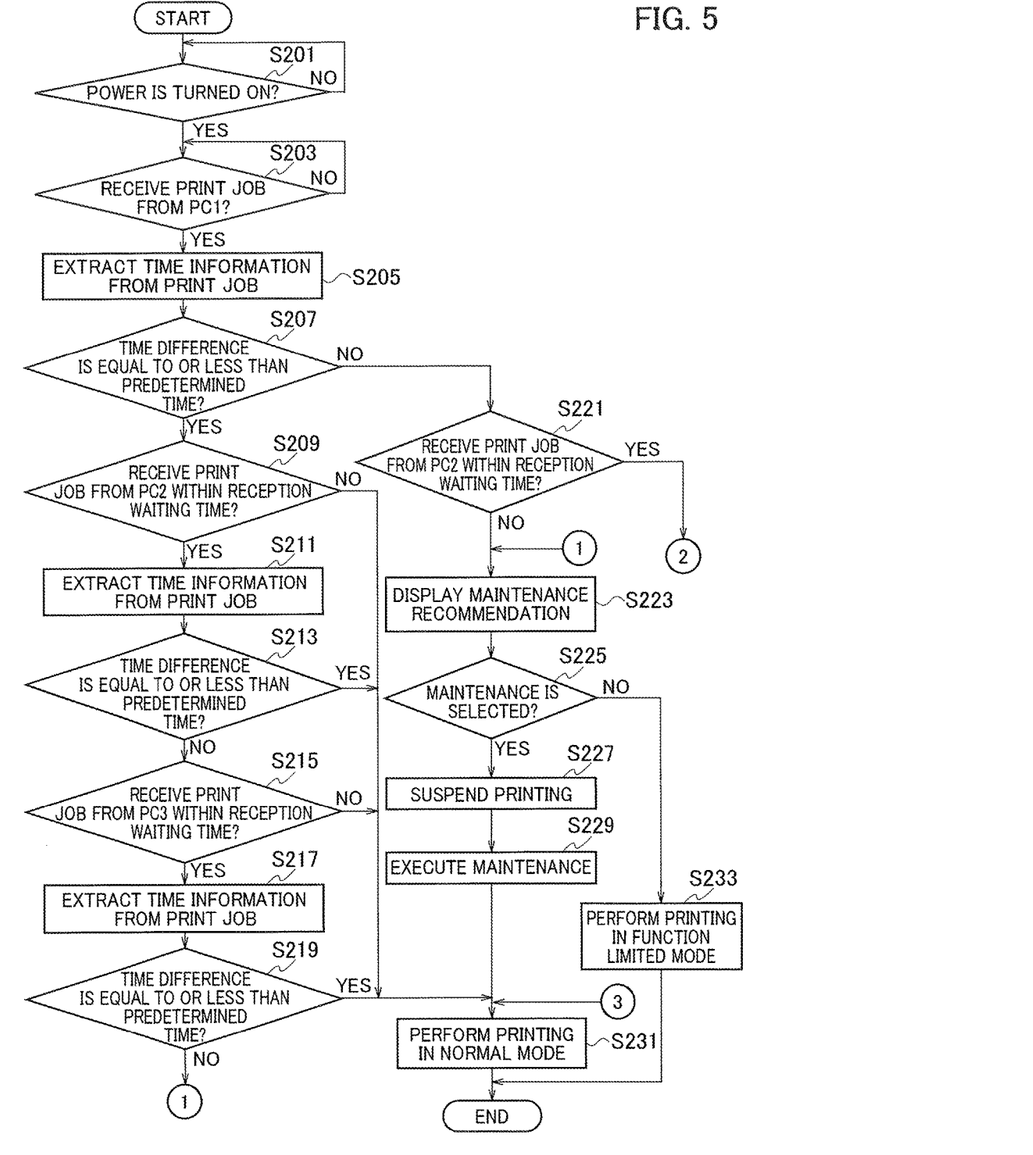
FIG. 5 is a flowchart illustrating processing contents of a printer according to Embodiment 2 of the present invention.
Figure 6:
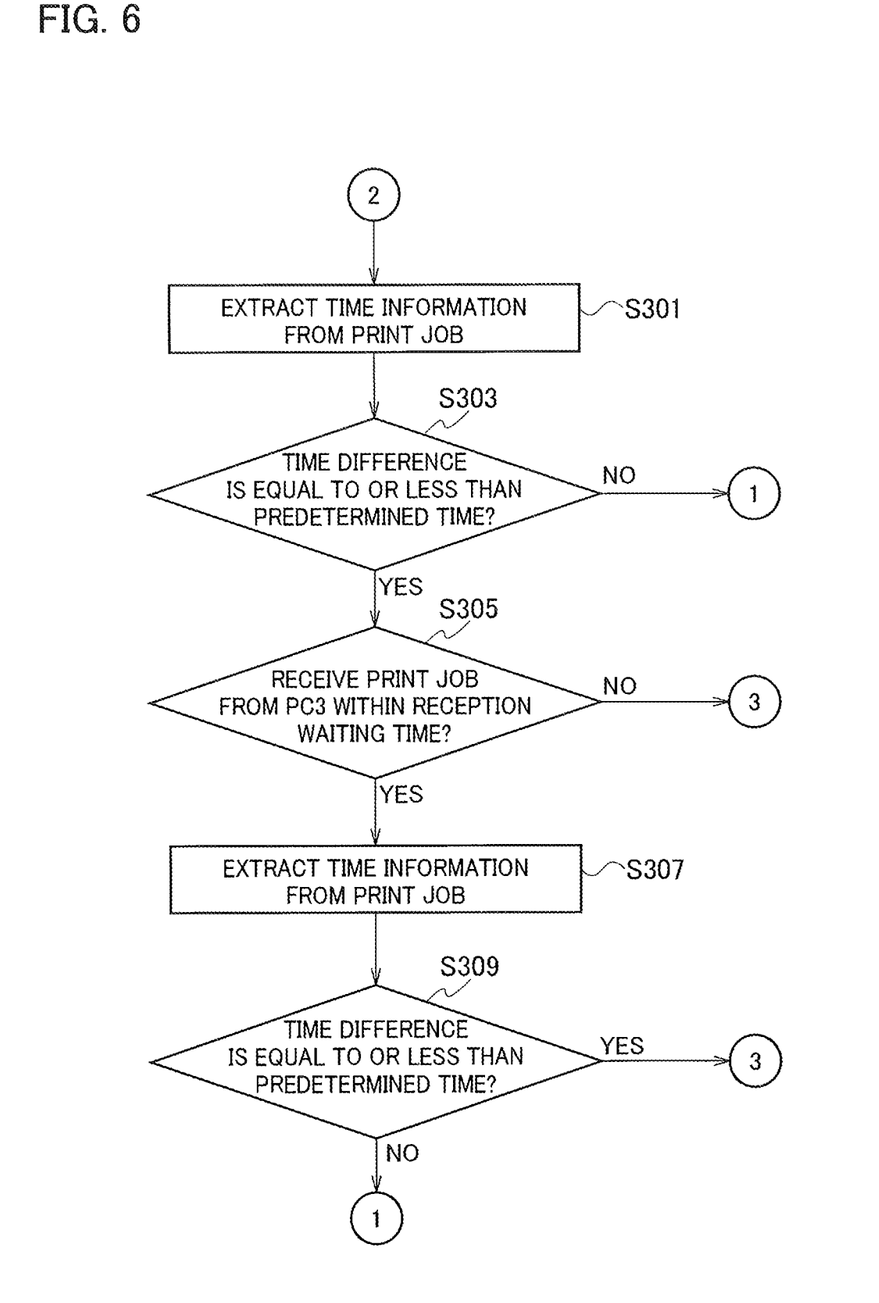
FIG. 6 is a flowchart illustrating processing contents of a printer according to Embodiment 2.

FIGS. 5 and 6 are flowcharts illustrating processing contents of the printer 1A.

As illustrated in FIG. 5, when power is turned on (step S201), the printer 1A determines whether the print job is received from a first client 2 (step S203). Note that the first client 2 is one of the clients 2 and can be any of the clients 2. In this description, the clients 2 are referred to as the first client 2, a second client 2, and a third client 2 in the order of reception of the print jobs therefrom for the sake of convenience.

When the printer 1A determines that is received the print job from the first client 2 (YES in step S203), the extracting section 11c extracts the time information included in the print job received from the first client 2 as the existing region time information (step S205).

Next, the determining section 11a compares the existing region time information extracted from the print job received from the first client 2 and the initial setting time information 12a1 (region set time information) stored in the storage 12 to determine whether the time difference from the time of the first client 2 is equal to or less than the predetermined time (step S207). In this case, the predetermined time is determined based on the predetermined time setting information 12b, as a predetermined time corresponding to the delivery information included in the initial setting time information 12a1.

When the determining section 11a determines that the time difference from the time of the first client 2 is equal to or less than the predetermined time (YES in step S207), the determining section 11a determines whether the print job is received from the second client 2 within a reception waiting time, to refer to the result of comparison with the time information of the second client 2 (step S209). In this case, the reception waiting time means predetermined time from the point of reception of the print job to the point of reception of the next print job.

The reception waiting time is set due to the following reason. When the printer 1A receives the first print job and then waits for the next print job for a long time, the processing on the first print job is delayed. The reception waiting time is thus set to prevent this delay.

When no print job is received from the second client 2 within the reception waiting time (NO in step S209), the determining section 11a trusts the result of comparison with the time information of the first client 2. Specifically, the determining section 11a assumes that there are the following possibilities: the printer 1A is continuously used in the region where it has been originally used; the clock of the printer 1A is off when the time information does not match; or the printer 1A is moved to a relatively close region.

The CPU 11 thus causes the processing to proceed to step S231 and executes the print processing in the normal mode without the operation limits (step S231).

When the print job is received from the second client 2 within the reception waiting time (YES in step S209), the extracting section 11c extracts the time information included in the print job received from the second client 2 as the existing region time information (step S211).

Next, the determining section 11a compares the existing region time information extracted from the print job received from the second client 2 and the initial setting time information 12a1 (region set time information) stored in the storage 12 to determine whether the time difference from the time of the second client 2 is equal to or less than the predetermined time (step S213).

When the determining section 11a determines that the time difference from the time of the second client 2 is equal to or less than the predetermined time (YES in step S213), the time difference is equal to or less than the predetermined time in the comparison with the time information of the first client 2 (YES in step S207) and the time difference is equal to or less than the predetermined time in the comparison with the time information of the second client 2 (YES in step S213). In other words, the time difference is equal to or less than the predetermined time in the results of comparison with the time information for two of the three clients 2. The determining section 11a thus assumes that there are the following possibilities: the printer 1A is continuously used in the region where it has been originally used; the clock of the printer 1A is off when the time information does not match; or the printer 1A is moved to a relatively close region.

The CPU 11 thus causes the processing to proceed to step S231 and executes the print processing in the normal mode without the operation limits (step S231).

Meanwhile, when the determining section 11a determines that the time difference from the time of the second client 2 exceeds the predetermined time (NO in step S213), the time difference is equal to or less than the predetermined time in the comparison with the time information of the first client (YES in step S207) but the time difference exceeds the predetermined time in the comparison with the time information of the second client 2 (NO in step S213). In other words, the time difference is equal to or less than the predetermined time for one of the three clients 2 and the time difference exceeds the predetermined time for another one of the three clients 2.

Accordingly, the determining section 11a determines whether the print job is received from the third client 2 within the reception waiting time to refer to the result of comparison with the time information of the third client 2 (step S215).

When no print job is received from the third client 2 within the reception waiting time (NO in step S215), the determining section 11a trusts the result of comparison with the time information of the first client 2. Specifically, the time information is obtained from two clients 2 and the time difference is equal to or less than the predetermined time in the result of comparison with the time information of one of the two clients 2. The determining section 11a thus assumes that there are the following possibilities: the printer 1A is continuously used in the region where it has been originally used; the clock of the printer 1A is off when the time information does not match; or the printer 1A is moved to a relatively close region.

The CPU 11 thus causes the processing to proceed to step S231 and executes the print processing in the normal mode without the operation limits (step S231).

When the print job is received from the third client 2 within the reception waiting time (YES in step S215), the extracting section 11c extracts the time information included in the print job received from the third client 2 as the existing region time information (step S217).

Next, the determining section 11a compares the existing region time information extracted from the print job received from the third client 2 and the initial setting time information 12a1 (region set time information) stored in the storage 12 to determine whether the time difference from the time of the third client 2 is equal to or less than the predetermined time (step S219).

When the determining section 11a determines that the time difference from the time of the third client 2 exceeds the predetermined time (NO in step S219), the time difference is equal to or less than the predetermined time in the comparison with the time information of the first client 2 (YES in step S207) but the time difference exceeds the predetermined time in the comparison with the time information of the second and third clients 2 (NO in steps S213, S219). In other words, the time difference exceeds the predetermined time in the results of comparison with the time information of two of the three clients 2. Accordingly, there is a possibility that the printer 1A is moved to a region distant from the region where the printer 1A has been shipped and installed and that the current setting is not optimal in a usage environment where the printer 1A is moved.

In order to prompt optimization of the setting, the selection displaying section 11b displays the maintenance recommendation screen on the operation panel 14 (step S223). Note that, since the maintenance recommendation screen is the same as that illustrated in FIG. 3, description thereof is omitted.

When the button 14d is pressed by the user in the maintenance recommendation screen (YES in step S225), the printing is suspended to execute the maintenance (step S227).

Then, the user calls the service personnel and the service personnel performs maintenance work such as correction of the delivery information, correction of the initial setting time information 12a1 in accordance with the region where the printer 1 is to be used, and correction of the driving power supply in accordance with the region where the printer 1 is to be used. Thereafter, the printer 1A is recovered (step S229) and the print processing is executed in the normal mode without the operation limits (step S231).

Meanwhile, when the user does not select the execution of maintenance, that is presses the button 14c in step S225 (NO in step S225), the selection displaying section 11b sets the mode of print processing to the function limited mode and executes the printing in the function limited mode (step S233). Making the function limited mode selectable allows the user to cause the printer 1 to execute the print processing with the print speed and the continuous printable time being limited, instead of immediately performing the maintenance and establishing the setting optimal for the current usage environment. Accordingly, the printing can be continued with the failure rate reduced and the print quality guaranteed.

Meanwhile, when no print job is received from the third client 2 within the reception waiting time in step S215 (NO in step S215), the time difference is equal to or less than the predetermined time in the comparison with the time information of the first client 2 (YES in step S207) but the time difference exceeds the predetermined time in the comparison with the time information of the second client 2 (NO in step S213). In other words, the time difference is equal to or less than the predetermined time for one of the three clients 2 and the time difference exceeds the predetermined time for another one of the three clients 2. Since no print job is sent from the third client 2 and the time difference is determined to be equal to or less than the predetermined time once (YES in step S207), the CPU 11 employs this determination result and causes the processing to proceed to step S231 to execute the print processing in the normal mode without the operation limits (step S231).

Moreover, when the determining section 11a determines that the time difference from the time of the third client 2 is equal to or less than the predetermined time in step S219 (YES in step S219), the time difference is equal to or less than the predetermined time in the comparison with the time information of the first client 2 and the third client 2 (YES in steps S207, S219) but the time difference exceeds the predetermined time in the comparison with the time information of the second client 2 (NO in step S213). In other words, the time difference is equal to or less than the predetermined time for two of the three clients 2 and the time difference exceeds the predetermined time for one of the three clients 2. Accordingly, the CPU 11 causes the processing to proceed to step S231 based on this determination result and executes the print processing in the normal mode without the operation limits (step S231).

Moreover, when the determining section 11a determines that the time difference from the time of the first client 2 exceeds the predetermined time in step S207 (NO in step S207), the determining section 11a determines whether the print job is received from the second client 2 within the reception waiting time, to refer to the result of comparison with the time information of the second client 2 (step S221).

When no print job is received from the second client 2 within the reception waiting time in step S221 (NO in step S221), the CPU 11 causes the processing to proceed to step S223 based on the comparison with the time information of the first client and the selection displaying section 11b displays the maintenance recommendation screen on the operation panel 14 to prompt optimization of the setting (step S223).

Meanwhile, when the print job is received from the second client 2 within the reception waiting time in step S221 (YES in step S221), the processing proceeds to step S301 illustrated in FIG. 6.

In step S301, the extracting section 11c extracts the time information included in the print job received from the second client 2 as the existing region time information.

Next, the determining section 11a compares the existing region time information extracted from the print job received from the second client 2 and the initial setting time information 12a1 (region set time information) stored in the storage 12 to determine whether the time difference from the time of the second client 2 is equal to or less than the predetermined time (step S303).

When the determining section 11a determines that the time difference from the time of the second client 2 exceeds the predetermined time (NO in step S303), the time difference exceeds the predetermined time in the comparison with the time information of the first client 2 and the second client 2 (NO in steps S207, S303). In other words, the time difference exceeds the predetermined time in the results of comparison with the time information of two of the three clients 2. Accordingly, there is a possibility that the printer 1A is moved to a region distant from the region where the printer 1A has been shipped and installed and that the current setting is not optimal in a usage environment where the printer 1A is moved.

The CPU 11 thus causes the processing to proceed to step S223 and the selection displaying section 11b displays the maintenance recommendation screen on the operation panel 14 to prompt optimization of the setting (step S223).

Meanwhile, when the determining section 11a determines that the time difference from the time of the second client 2 is equal to or less than the predetermined time (YES in step S303), the time difference exceeds the predetermined time in the comparison with the time information of the first client 2 (NO in step S207) but the time difference is equal to or less than the predetermined time in the comparison with the time information of the second client 2 (YES in step S303). In other words, the time difference is equal to or less than the predetermined time for one of the three clients 2 and the time difference exceeds the predetermined time for another one of the three clients 2.

Then, the determining section 11a determines whether the print job is received from the third client 2 within the reception waiting time to refer to the result of comparison with the third client 2 (step S305).

When no print job is received from the third client 2 within the reception waiting time (NO in step S305), the determining section 11a trusts the result of comparison with the time information of the second client 2. Specifically, the time information is obtained from the two clients 2 and the time difference is equal to or less than the predetermined time in the result of comparison with the time information of one of the two clients 2. The determining section 11a thus assumes that there are following possibilities: the printer 1A is continuously used in the region where it has been originally used; the clock of the printer 1A is off when the time information does not match; or the printer 1A is moved to a relatively close region.

The CPU 11 thus causes the processing to proceed to step S231 and executes the print processing in the normal mode without the operation limits (step S231).

Meanwhile, when the print job is received from the third client 2 within the reception waiting time (YES in step S305), the extracting section 11c extracts the time information set for each region and included in the print job received from the third client 2 (step S307).

The determining section 11a compares the time information extracted from the print job received from the third client 2 and the initial setting time information 12a1 stored in the storage 12 to determine whether the time difference from the time of the third client 2 is equal to or less than the predetermined time (step S309).

When the determining section 11a determines that the time difference from the time of the third client 2 exceeds the predetermined time (NO in step S309), the time difference is equal to or less than the predetermined time in the comparison with the time information of the second client 2 (YES in step S303) but the time difference exceeds the predetermined time in the comparison with the time information of the first client 2 and the third client 2 (NO in steps S207, S309). In other words, the time difference exceeds the predetermined time in the results of comparison with the time information of two of the three clients 2. Accordingly, there is a possibility that the printer 1A is moved to a region distant from the region where the printer 1A has been shipped and installed and that the current setting is not optimal in a usage environment where the printer 1A is moved.

The CPU 11 causes the processing to proceed to step S223 and the selection displaying section 11b displays the maintenance recommendation screen on the operation panel 14 to prompt optimization of the setting (step S223).

Meanwhile, when the determining section 11a determines that the time difference from the time of the third client 2 is equal to or less than the predetermined time in step S309 (YES in step S309), the time difference exceeds the predetermined time in the comparison with the time information of the first client 2 (NO in step S207) but the time difference is equal to or less than the predetermined time in the comparison with the time information of the first client 2 and the third client 2 (YES in steps S303, S309). In other words, the time difference is equal to or less than the predetermined time for two of the three clients 2 and the time difference exceeds the predetermined time in one of the three clients 2. Accordingly, the CPU 11 causes the processing to proceed to step S231 based on this determination result and executes the print processing in the normal mode without the operation limits (step S231).

As described above, in the printer 1A according to Embodiment 2, when the print jobs are received from the three clients 2, the extracting section 11c extracts the time information included in each of the received print jobs as the existing region time information, the determining section 11a compares the existing region time information extracted from each of the print jobs received from the three clients and the region set time information indicating the time information set for the region where the printer 1 is allowed to be present, the determining section 11a determines whether the number of print jobs with the time difference exceeding the predetermined time exceeds half the number of the multiple print jobs, and when the determining section 11a determines that the number of print jobs with the time difference exceeding the predetermined time exceeds half the number of the multiple print jobs, the selection displaying section 11b calls for the execution of the maintenance of the printer 1A and also selectably displays options of the execution of the maintenance of the printer 1A and the execution of the limited print processing by the image former 15.

Accordingly, the printer 1A can make assumptions about whether the printer 1A is moved to a region distant from the region where the printer 1A has been originally shipped and used, also when no server 4 is provided, by using the time information included in each of the print jobs received from the multiple clients 2 connected via the network 3.

The user can thereby recognize that the maintenance of optimizing the setting of the printer 1 is necessary and thus immediately call the service personnel to have the service personnel execute the maintenance.

Meanwhile, when the user desires to perform printing as soon as possible even with limits, the printer 1A can continue the limited printing operation.

As described above, the user can select either the optimization of the setting by maintenance or the continuance of the printing with the functions being limited.

Note that, in Embodiment 2, when the printer 1A receives the print job to which the time information set in the client 2 is attached, the extracting section 11c extracts the time information included in the received print job as the existing region time information, but the present invention is not limited to this configuration.

For example, the configuration may be such that a region time information management server which manages the time information of the region is provided and the printer 1A obtains the existing region time information from this region time information management server via the network 3.

Note that, in Embodiment 2, description is given of the example in which the printer 1A is connected to the three clients 2 via the network 3, but the present invention is not limited to this configuration. The printer 1A may be connected to multiple clients 2 such as two, four, five, six, seven, . . . clients 2.

For example, when the printer 1A is connected to five clients 2, the determining section 11a determines whether the time difference exceeds the predetermined time for three of five pieces of time information. When the printer 1A is connected to six clients 2, the determining section 11a determines whether the time difference exceeds the predetermined time in four of six pieces of time information.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A printer comprising:
   an image former configured to form an image on a sheet based on a print job;
   a processor; and
   a memory including instructions that, when executed by the processor, cause the processor to perform operations including:
      comparing first time information indicating time information set for a region where the printer is allowed to be present and second time information indicating time information in a region where the printer is currently present and determining whether a time difference between the first time information and the second time information is greater than a predetermined time, and
      upon determining that the time difference is greater than the predetermined time, calling for execution of maintenance of the printer and selectably displaying options of the execution of the maintenance of the printer and execution of limited print processing by the image former.

2. The printer according to claim 1, wherein
   the printer is connected to information processing devices via a network, and
   the operations include:
      upon receiving, from each of the information processing devices, the print job to which third time information set in the information processing device is attached, extracting the third time information from the received print job as the second time information;
      comparing the first time information and the second time information extracted from each of the print jobs received from the respective information processing devices and determining whether a number of the print jobs with the time difference greater than the predetermined time exceeds half a number of the plurality of print jobs; and
      upon determining that the number of the print jobs with the time difference greater than the predetermined time exceeds half the number of the plurality of print jobs, calling for the execution of the maintenance of the printer and selectably displaying options of the execution of the maintenance of the printer and the execution of the limited print processing by the image former.

3. The printer according to claim 1, wherein
   the printer is connected to information processing devices via a network, and
   the operations include:
      upon receiving, from each of the information processing devices, the print job to which third time information set in the information processing device is attached, extracting the third time information from the received print job as the second time information;
      upon receiving the print job from one of the information processing devices and not receiving the print jobs from any of the remaining information processing devices within a predetermined period after reception of the print job from the one of the information processing devices, comparing the second time information extracted from the received print job and the first time information and determining whether the time difference is greater than the predetermined time; and
      upon determining that the time difference is greater than the predetermined time, calling for the execution of the maintenance of the printer and selectably displaying options of the execution of the maintenance of the printer and the execution of the limited print processing by the image former.

* * * * *